United States Patent
Park et al.

(10) Patent No.: US 10,963,511 B2
(45) Date of Patent: *Mar. 30, 2021

(54) VESSEL DATA INTEGRATION SYSTEM

(71) Applicants: Hyundai Heavy Industries Co., Ltd., Ulsan (KR); Korea Shipbuilding & Offshore Engineering Co., Ltd., Seoul (KR)

(72) Inventors: Ki Soo Park, Ulsan (KR); Jong Gu Kang, Ulsan (KR); Young Soo Cheong, Ulsan (KR); Jee Hoon Park, Ulsan (KR); Seong Min Ha, Ulsan (KR); Dan Bi Lee, Ulsan (KR); Chan Ho Song, Ulsan (KR)

(73) Assignees: Hyundai Heavy Industries Co., Ltd., Ulsan (KR); Korea Shipbuilding & Offshore Engineering Co., Ltd, Seoul (KR)

(*) Notice: Subject to any disclaimer, the term of this patent is extended or adjusted under 35 U.S.C. 154(b) by 129 days.

This patent is subject to a terminal disclaimer.

(21) Appl. No.: 16/308,351

(22) PCT Filed: Jul. 27, 2016

(86) PCT No.: PCT/KR2016/008238
§ 371 (c)(1),
(2) Date: Dec. 7, 2018

(87) PCT Pub. No.: WO2017/213291
PCT Pub. Date: Dec. 14, 2017

(65) Prior Publication Data
US 2019/0188225 A1    Jun. 20, 2019

(30) Foreign Application Priority Data
Jun. 9, 2016 (KR) .......... 10-2016-0071685

(51) Int. Cl.
*G06F 16/00* (2019.01)
*G06F 16/84* (2019.01)
(Continued)

(52) U.S. Cl.
CPC .............. *G06F 16/84* (2019.01); *B63B 49/00* (2013.01); *B63B 69/00* (2013.01); *B63B 71/00* (2020.01);
(Continued)

(58) Field of Classification Search
CPC ...... G06F 16/84; G06F 16/285; G06F 16/909; G06F 16/288
See application file for complete search history.

(56) References Cited

U.S. PATENT DOCUMENTS 7,487,015 B1 * 2/2009 Houlbert ................ G01C 21/16
244/158.1
2002/0188776 A1 * 12/2002 Houlberg ............... H04L 69/08
710/62
(Continued)

FOREIGN PATENT DOCUMENTS

KR  10-1103279 B1  1/2012
KR  10-1527681 B1  6/2015

OTHER PUBLICATIONS

L. Cazzanti et al., "A Document-based Data Model for Large Scale Computational Maritime Situational Awareness", 2015 IEEE International Conference on Big Data, Oct. 29, 2015, pp. 1350-1356.
(Continued)

*Primary Examiner* — Khanh B Pham
(74) *Attorney, Agent, or Firm* — Blank Rome LLP

(57) ABSTRACT

The present invention relates to a vessel data integration system and a vessel comprising same. Accordingly, the present invention preferably comprises: a first vessel data conversion device for converting first vessel data which
(Continued)

have a non-standard format and are received from first equipment into integrated vessel data by using a vessel data model (VDM)-based VDM path; and a second vessel data conversion device for converting second vessel data which have a standard format and are received from second equipment into the integrated vessel data.

14 Claims, 14 Drawing Sheets

(51) Int. Cl.

| | | |
|---|---|---|
| *G06F 16/909* | (2019.01) | |
| *G06F 16/903* | (2019.01) | |
| *G06F 16/9038* | (2019.01) | |
| *G06F 16/9035* | (2019.01) | |
| *B63J 99/00* | (2009.01) | |
| *G06Q 50/00* | (2012.01) | |
| *B63B 71/00* | (2020.01) | |
| *G06F 16/25* | (2019.01) | |
| *B63B 69/00* | (2013.01) | |
| *G07C 5/00* | (2006.01) | |
| *G06F 16/28* | (2019.01) | |
| *B63B 49/00* | (2006.01) | |
| *G06F 9/54* | (2006.01) | |
| *G08G 3/00* | (2006.01) | |
| *B63B 79/00* | (2020.01) | |
| *G06K 9/62* | (2006.01) | |

(52) U.S. Cl.
CPC .............. *B63J 99/00* (2013.01); *G06F 9/546* (2013.01); *G06F 16/258* (2019.01); *G06F 16/285* (2019.01); *G06F 16/288* (2019.01); *G06F 16/909* (2019.01); *G06F 16/9035* (2019.01); *G06F 16/9038* (2019.01); *G06F 16/90335* (2019.01); *G06Q 50/00* (2013.01); *G07C 5/008* (2013.01); *G08G 3/00* (2013.01); *B63B 79/00* (2020.01); *G06F 9/541* (2013.01); *G06K 9/6288* (2013.01)

(56) References Cited

U.S. PATENT DOCUMENTS

| | | | | |
|---|---|---|---|---|
| 2006/0235608 | A1* | 10/2006 | Chang .................... | G08G 1/092 701/532 |
| 2010/0302095 | A1* | 12/2010 | Yu .......................... | G01S 19/05 342/357.4 |
| 2012/0116667 | A1* | 5/2012 | Brands ................... | G07B 15/06 701/408 |
| 2016/0013998 | A1 | 1/2016 | Coloney et al. | |

OTHER PUBLICATIONS

J-W. Park et al., "The Current Situation of the Digital Interface International Standards and an Analysis of Integration Condition of Ships." Journal of the Society of Naval Architects of Korea, vol. 48, No. 6, pp. 490-500, Dec. 2011.

J-H. Lee et al., "Conversion and Storage of NMEA 2000 PGN Data into IEC 61162-4 Tag Format." Journal of the Korean Society of Marine Engineering, vol. 34, No. 4, pp. 522-531, 2010.

P. Strnad et al., "Mapping XML to Key-Value Database Mapping XML to Key-Value Database," DBKDA 2013: The Fifth International Conference on Advances in Databases, Knowledge, and Data Applications, pp. 121-127 (2013).

* cited by examiner

VESSEL DATA INTEGRATION SYSTEM

TECHNICAL FIELD

The present disclosure relates to a vessel data integration system and a vessel comprising the same.

BACKGROUND ART

Vessels are categorized according to the purpose of use, the type of cargo and the method by which the cargo is loaded, and vessels may be classified into commercial vessels, specialized vessels, military vessels and fishing vessels according to the purpose of use, and may be classified into container ships, bulk carriers, tankers, chemical tankers, LPG carriers, LNG carriers and car carriers according to the type of cargo.

Various types of vessels as described above each have a great deal of sensors and devices mounted thereon to function for use that suits the purpose.

Each sensor and device are collected and processed by integration equipment and provided to a service necessary for safe navigation, and because one or more sensors and devices are made using different protocols for each manufacturer, it was not easy to collect data, and even though data is collected, there is no method for managing the collected data in an integrated manner, so there are many constraints on transfer and utilization of the collected data not only on board but also on shore.

Meanwhile, International Maritime Organization (IMO) compels the specified "Maritime navigation and radiocommunication equipment and systems" (e.g., Voyage Data Recorder (VDR), Integrated Navigation System (INS), etc.) to conform to International Electronical Committee (IEC) 61162 based digital interfaces. Here, IEC 61162 is the communication standards for communication interfaces between "Maritime navigation and radiocommunication equipment and systems", and IEC 61162 is aligned with the National Marine Electronics Association (NMEA) standard.

In contrast, equipment (e.g., Alarm Monitoring System (AMS), Bridge Maneuvering System (BMS), etc.) other than "Maritime navigation and radiocommunication equipment and systems" is not bound to conform to IEC 61162. Additionally, there is a great limitation in expressing data using the already published NMEA, and thus other industrial standards or a de facto standard is mainly selected and used.

By this reason, there is no common standard for interfacing between equipment other than "Maritime navigation and radiocommunication equipment and systems".

For example, the NMEA sentence structure receiving the position from Global Positioning System (GPS) is as shown in FIG. 1. The NMEA sentence is shared between system developers through a standard document, but any individual modification is not allowed.

When data to be used on the IEC 61162 standards is not data that is predefined in NMEA sentence, is it is necessary to additionally perform a task for defining the corresponding data in NMEA sentence under the mutual agreement, and share through an interface agreement document between them.

As described above, when data to be used on the IEC 61162 standards is not predefined in NMEA sentence, there is inconvenience in having to additionally define the data, write it in a document and share it.

TECHNICAL PROBLEM

The present disclosure is designed to solve the above-described problem, and therefore the present disclosure is directed to providing a vessel data integration system for converting various formats of vessel data into a vessel data model (VDM)-based integrated vessel data format and managing (collecting, storing, providing) it in an integrated manner, and a vessel comprising the same.

SUMMARY OF THE INVENTION

To achieve the above-described object, a vessel data integration system according to an embodiment of the present disclosure includes a first vessel data conversion device for converting first vessel data which have a nonstandard format and are received from first equipment into integrated vessel data by using a vessel data model (VDM)-based VDM Path, and a second vessel data conversion device for converting second vessel data which have a standard format and are received from second equipment into the integrated vessel data.

In the vessel data integration system according to an embodiment of the present disclosure, the first equipment collects vessel data in different formats, extracts Key and Value by parsing the collected vessel data in different formats, and outputs the extracted Key and Value to the first vessel data conversion device.

In the vessel data integration system according to an embodiment of the present disclosure, the second equipment collects vessel data in different formats, converts the collected vessel data in different formats into a standard format, and outputs it to the second vessel data conversion device.

In the vessel data integration system according to an embodiment of the present disclosure, the standard format is a National Marine Electronics Association (NMEA) format.

In the vessel data integration system according to an embodiment of the present disclosure, the first vessel data conversion device converts the first vessel data into the integrated vessel data by replacing the Key received from the first equipment with VDM Path.

In the vessel data integration system according to an embodiment of the present disclosure, the first vessel data conversion device is included in the first equipment.

In the vessel data integration system according to an embodiment of the present disclosure, the first vessel data conversion device includes a mapper including a mapping configuration description file that defines a mapping rule between Key and VDM Path, and which converts the first vessel data into the integrated vessel data by replacing Key received from the first equipment with VDM Path according to the mapping rule, and a queue client to transmit the integrated vessel data converted by the mapper to a data processing unit using a queue-based transmission protocol.

In the vessel data integration system according to an embodiment of the present disclosure, the second vessel data conversion device extracts Key and Value by parsing the second vessel data received from the second equipment, and converts the second vessel data into the integrated vessel data by replacing the Key with VDM Path.

In the vessel data integration system according to an embodiment of the present disclosure, the second vessel data conversion device includes a listener to receive the second vessel data from the second equipment, a vessel data parsing unit to extract Key and Value by parsing the second vessel data, a mapper including a mapping configuration description file that defines a mapping rule between Key and VDM Path, and which converts the second vessel data into the integrated vessel data by replacing the Key with VDM Path according to the mapping rule, and a queue client to transmit the integrated vessel data converted by the mapper to a data processing unit using a queue-based transmission protocol.

In the vessel data integration system according to an embodiment of the present disclosure, the integrated vessel data includes the VDM Path and the Value.

In the vessel data integration system according to an embodiment of the present disclosure, the mapper verifies the validity of Value according to attribute of Data Attribute when converting the first vessel data or the second vessel data into the integrated vessel data.

In the vessel data integration system according to an embodiment of the present disclosure, the VDM Path is an object identifier for identifying each instance defined by VDM.

Meanwhile, a vessel data conversion device according to an embodiment of the present disclosure includes a receiving unit to receive Key and Value from equipment that collects vessel data in different formats, the Key and the Value being vessel data in a non-standard format, and a vessel data conversion unit to convert the Key and the Value into integrated vessel data by replacing the Key with VDM-based VDM Path.

Meanwhile, a vessel data conversion device according to another embodiment of the present disclosure includes a receiving unit to receive vessel data in a standard format from equipment which collects vessel data in different formats, a parsing unit to extract Key and Value by parsing the vessel data in a standard format, and a vessel data conversion unit to convert the Key and the Value into integrated vessel data by replacing the Key with VDM-based VDM Path.

Meanwhile, a method for converting vessel data according to an embodiment of the present disclosure includes the first vessel data conversion step of converting, by a first vessel data conversion device, first vessel data which have a non-standard format and are received from first equipment into integrated vessel data by using VDM-based VDM Path, and the second vessel data conversion step of converting, by a second vessel data conversion device, second vessel data which have a standard format and are received from second equipment into the integrated vessel data by using VDM-based VDM Path.

In the method for converting vessel data according to an embodiment of the present disclosure, the first vessel data conversion step includes receiving, by the first vessel data conversion device, Key and Value from the first equipment, the Key and the Value being the first vessel data, and converting, by the first vessel data conversion device, the first vessel data into the integrated vessel data by replacing the Key with VDM-based VDM Path.

In the method for converting vessel data according to an embodiment of the present disclosure, the second vessel data conversion step includes receiving, by the second vessel data conversion device, the second vessel data from the second equipment, extracting, by the second vessel data conversion device, Key and Value, by parsing the second vessel data, and converting, by the second vessel data conversion device, the second vessel data into the integrated vessel data by replacing the Key with VDM-based VDM Path.

ADVANTAGEOUS EFFECTS

According to the vessel data integration system of the present disclosure and the vessel comprising the same, it is possible to manage (collect, store, provide) vessel data in various formats made by different protocols into an integrated data format.

Additionally, the vessel data integration system according to an embodiment of the present disclosure and the vessel comprising the same does not directly collect vessel data and collects data through existing vessel equipment, thereby simplifying cabling, design and so on.

DETAILED DESCRIPTION OF THE PREFERRED EMBODIMENTS

Figure 1:
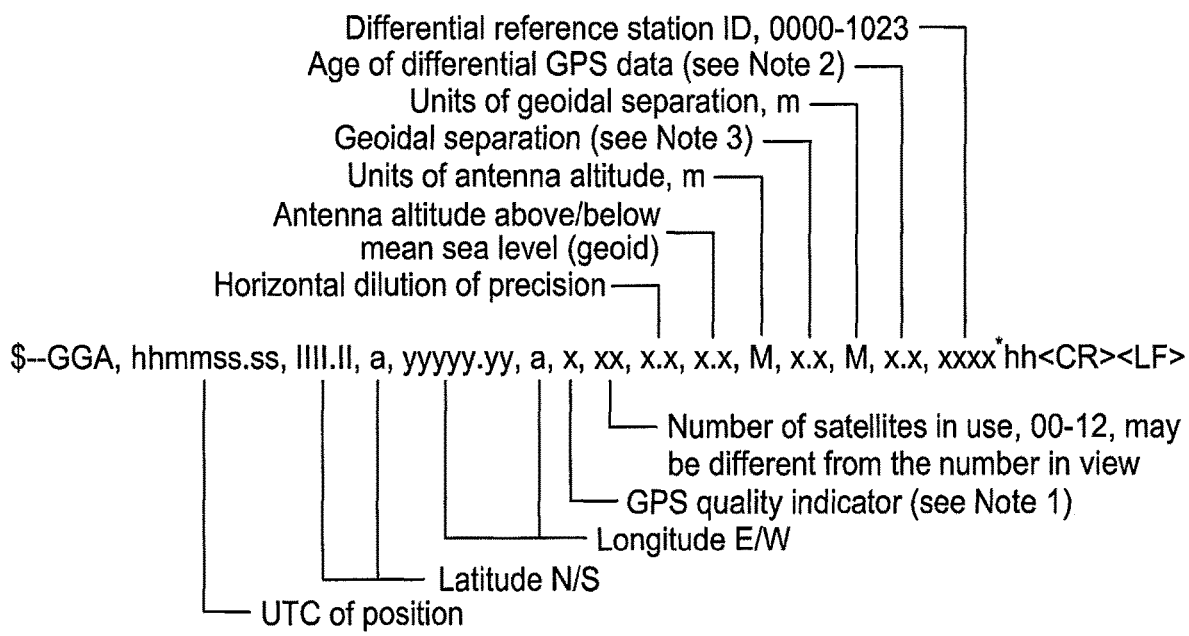
FIG. 1 is an exemplary diagram showing the conventional NMEA sentence structure.

Hereinafter, a vessel data integration system according to a preferred embodiment of the present disclosure and a vessel comprising the same will be described in detail with reference to the accompanying drawings.

In describing the embodiments of the specification, when a certain detailed description of relevant known elements or functions is determined to render the subject matter of the present specification vague, the detailed description may be omitted herein.

The terms "comprises" and "comprising" as used herein specify the presence of stated functions, operations and elements, but do not preclude the presence or addition of one or more other functions, operations and elements. Additionally, it should be understood that the term "comprises" or "includes" when used in this specification specifies the presence of stated features, figures, steps, operation, elements, components or groups thereof, but does not preclude the presence or addition of one or more other features, figures, steps, operations, elements, components or groups thereof. As used herein, the singular forms are intended to include the plural forms as well, unless the context clearly indicates otherwise.

The key terms as used herein are defined as follows.

Vessel data integration platform (VDIP) is for collecting, processing, analyzing, storing and transmitting various vessel data, and refers to any system including software, firmware and hardware devices that manage vessel data in an integrated manner or their selective combinations, or may be used in software sense.

In an embodiment of the present disclosure, VDIP and a vessel data integration system may be used in the equivalent sense.

Vessel data model (VDM) is a data model for defining all data associated with the vessel into one system, and objectifies all devices ranging from the vessel itself to an end sensor and defines a relationship between objects and attributes of objects.

Vessel data model configuration description Language (VCL) is the language used to write a vessel data model configuration description file for describing VDM.

Vessel data model configuration description file is a configuration file that describes VDM in VCL.

Mapping configuration description file is a file that defines a rule for converting equipment output data into VDM-based integrated vessel data.

Mapping is a process of connecting equipment output data to VDM.

Equipment is mounted on the vessel for a special purpose, and collects various types of vessel data generated in the vessel, and transmits the collected vessel data to VDIP. Equipment may be divided into first equipment with a vessel data conversion device mounted thereon, and second equipment with no vessel data conversion device.

The first equipment is where a vessel data conversion device is directly mounted, and extracts Key that can identify vessel data and Value that is the content of vessel data by parsing the collected vessel data in various formats, converts the extracted Key and Value (Key:Value) into a VDM-based integrated vessel data format (VDM Path: Value) through the vessel data conversion device, and transmits the converted integrated vessel data to VDIP.

Additionally, the Key-Value is related with the data representation format, and Name-Value, Field-Value or Attribute-Value may be applied as a similar representation method. Accordingly, instead of Key, Name, Field or Attribute may be extracted.

The second equipment converts vessel data collected in various formats into a standard format (e.g., National Marine Electronics Association (NMEA) format), and transmits it to VDIP using the User Datagram Protocol (UDP) or in the form of a file.

The first vessel data conversion device converts first vessel data in "Key:Value" format outputted from the first equipment into a VDM-based integrated vessel data format (VDM Path:Value) through a mapping operation and transmits it to VDIP.

The second vessel data conversion device extracts Key and Value by parsing second vessel data received from the second equipment, and converts the extracted Key and Value (Key:Value) into a VDM-based integrated vessel data format (VDM Path:Value) through a mapping operation.

Raw data is data in various formats collected by equipment from sensors or devices.

Equipment output data is data in a particular format transmitted from equipment to the vessel data conversion device, and data outputted from the first equipment may be in Key and Value (Key:Value) format, and data outputted from the second equipment may be in a standard format (e.g., NMEA format).

Hereinafter, the present disclosure is described with reference to the accompanying drawings.

First, to realize the embodiments of the present disclosure, a Vessel Data Model (VDM) established to manage all formats of data generated in the vessel into one system is described.

The VDM largely has three conceptual categories, and the three concepts are vessel data standardization principle (Principle), Language and Common Data Structure.

Figure 2:
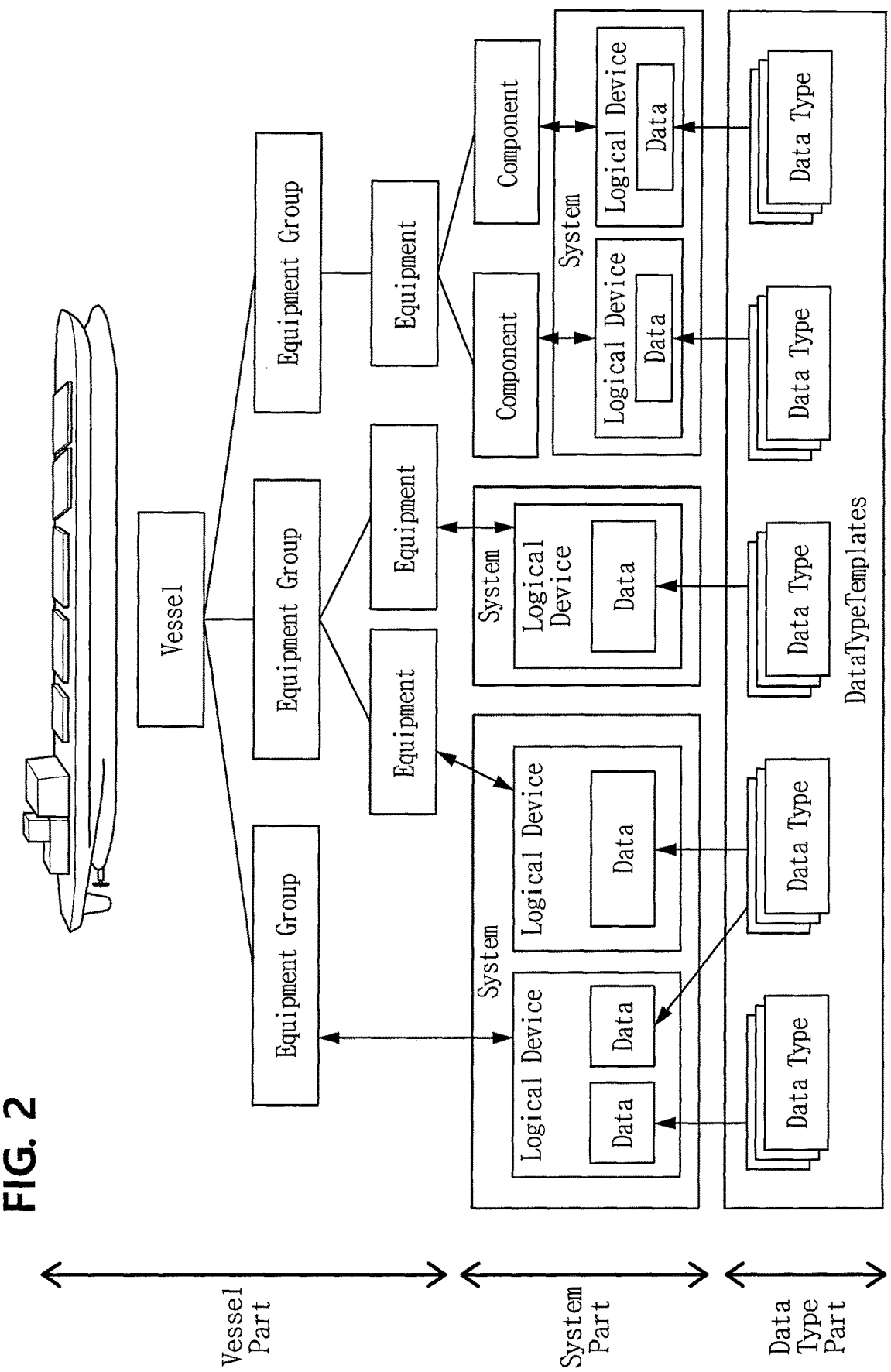
FIG. 2 is a schematic diagram showing the structure system of VDM applied to the present disclosure.

To represent vessel data, the VDM defines a combination of three models, Vessel Model of modeling Vessel Part, System Model of modeling System Part, and Data Model of modeling Data Type Part as shown in FIG. 2.

The vessel model is a hierarchical classification system of equipment that constitutes the vessel, and is an entire set of equipment that can be defined for each level, and the entire set can be extended.

As shown in Table 1, the vessel model may be defined as four levels.

TABLE 1

| Level | Name | Description | Remarks |
|---|---|---|---|
| Level 1 | Vessel | Vessel. Top-level element | |
| Level 2 | Equipment Group | Conceptual group of equipment | |
| Level 3 | Equipment | Real equipment or abstract/logical equipment | |
| Level 4 | Component | Subdivision of Equipment | optional |

As shown in FIG. 2, Vessel has one or more Equipment Groups, each Equipment Group has 0 or more Equipment, and each Equipment has 0 or more Component.

Here, the highest level, Level 1, is Vessel that signifies the vessel itself. Vessel includes an IMO number corresponding to a unique ID that identifies the vessel.

Instances of Level 2, Equipment Group level, make up one Vessel. Here, Equipment Group is subordinate to Vessel.

Level 2, Equipment Group, is a conceptual group of Level 3, Equipment, and uses the group name widely used for classification in the shipbuilding industry. For example, classification into Machinery, Hull, Electrical, and Navigational may be used.

Level 3, Equipment, is a level that mainly represents real equipment, and has the largest number of available items and instances in real equipment.

The Equipment level is not limited to only real equipment, and may represent abstract or logical equipment. For example, not only real physical equipment such as engines or boilers, but also abstract/logical concept such as stability indication and loading status may be applied.

Level 4, Component, is an optional level used when subdividing Equipment into smaller parts, and is used when classification and reuse is needed due to independency of Component itself or when the scale of Equipment itself is large. For example, in the case of the engine, many cylinders, auxiliary machines and piping systems form a huge integrated system, so when each is subdivided into components and defined, it is possible to classify under necessary viewpoints and separately make use of it.

The entire vessel model set described above can be continuously extended.

Meanwhile, the system model is a structured logical model for data generated from the equipment that constitutes the vessel.

Mechanical, electrical, hydraulic, pneumatic, electronic, communication or software (S/W) equipment exists together in the vessel, and data generated from the equipment is collected by devices (Information Technology (IT), electronic and S/W equipment) capable of collecting data.

The system model is used to define an internal data model for data that can be collected in the individual data collection devices.

The system model increases the reusability of the data model and manages the variability in the data collection device. For example, the data collection device, equipment A, is a device that collects data related to the engine and the piping system, the device's own logical model for the engine and the piping system may be established in the device. Additionally, when the data collection device, equipment B, is a device that mainly collects data related to navigation, a logical model mainly about navigation data will be established. In case that equipment B needs to collect some of the data of equipment A in the future, it is possible to reuse the model in such a way that equipment B imports and uses the logical model of equipment A.

As shown in Table 2, the system model may be defined as four levels.

TABLE 2

| Level | Name | Description | Remarks |
| --- | --- | --- | --- |
| Level 1 | System | System | |
| Level 2 | Logical Device | Top-level logical equipment modeling | |
| Level 3 | Logical Node | Basic unit of logical function | |
| Level 4 | Data Object | Instance of data type | |

System has one or more Logical Devices, each Logical Device has one or more Logical Nodes, and each Logical Node has one or more Data Objects.

Level 1, System level, represents a data collection device (equipment), and includes one or multiple logical devices.

Level 2, Logical Device level, is the highest-level concept of logical equipment modeling, and includes one or multiple logical nodes.

Logical Device may include, for example, models of main engine, generator engine, boiler, tank and positioning device defined in System, and may be a model of concept of their combination.

Level 3, Logical Node level, includes objects that are created by modeling the function units of the vessel domain, and is the most fundamental level of VDM. Logical Node may include the following three elements.

Prefix: prefix (optional) that defines Logical Node according to the purpose or use of Logical Node Class: indicates the type or category of Logical Node Inst: number necessary when indicating multiple objects The Logical Node name (LNName) is defined as <prefix>+<class>+<inst>, and this combination should be unique within a logical device to which the corresponding logical node belongs. For example, three pumps used in Central CFW system may be modeled using a predefined Pump Class, and each may be referred to as CentralCFWPump1, CentralCFWPump2, and CentralCFWPump3 so that they can be distinguished from other pumps using the prefix CentralCFW. If there is no overlap, CentralCFW may be omitted, and each may be defined as Pump1, Pump2, and Pump3.

Class of Logical Node is the key element of standardization that encourages to predefine and use the objects of the essential function units of the vessel domain.

Level 4, Data Object level, is the most basic unit of data configuration, and objectifies and defines Data Class of Data Model.

Meanwhile, the data model provides the means for creating a desired data object by providing a method that can define not only basic data type, but also their combination, or a composite data type.

When the system model is a structured logical model for data generated from equipment that constitutes the vessel, the data model is a model that represents the generated data itself, and the data type may be defined by recursive structuration. The data model increases the reusability of the data type and manages the variability.

This data model may include the following elements.

Data Class

Data Attribute

Recursion of Data Attribute (optional)

Basic Data Type

Data Object of the system model assigns an ID to objectify and define Data Class of the data model.

Data Class is a data type in which data attributes are grouped into a meaningful combination.

Data Attribute is the most basic unit of the data model and can be recursively defined, and finally, has one of basic data types (Float, Timestamp, String, . . . ) as a type.

As described above, VDM includes a vessel model, a system model and a data model, and these three models are combined to form a VDM.

The basic principle of a combination model that combines the three models described above is as follows.

Vessel model systematically classifies and hierarchically divides the vessel.

System model defines a logical node of logical equipment in a particular system.

Data model defines data class of data object of system model.

Instance of equipment or component level of vessel model may be connected with logical node of system model.

Connection information for connecting vessel model with logical node of system model may be set.

Connection information indicates system and logical device for connection of an only logical node.

Data object of system model objectifies data class of data model.

Each instance (object) defined by VDM as noted above is assigned with an object identifier for uniquely identifying each instance (object), and data attribute is defined.

VDM refers to the object identifier as VDM Path. That is, the VDM Path is used as a unique identifier for particular data in the vessel. Additionally, the VDM Path may be used as a routing rule for indicating particular vessel data on VDM.

For example, the rule of the VDM Path is as follows.

<VDM Path>=<Equipment Group Name>/<Equipment Name>/<Component Name>/<Logical Device Name>/<Logical Node Name>.<Data Object Name>.[<Data Attribute Name>]+

Here, <Logical Node Name> is composed of <prefix>+<class>+<inst>, and + following [<Data Attribute Name>] represents one or more repetitions.

| Vessel Model | | | System Model | | | | Data Model | |
|---|---|---|---|---|---|---|---|---|
| Equipment Group Name | Equipment Name | Component Name | Logical Device Name | Logical Node Name | | | Data Object Name | Data Attribute Name |
| | | | | Prefix | Class | Instance | | |

The VDM Path of this rule may or may not include the prefix of equipment and component of the vessel model and logical device and logical node of the system model if necessary.

The data attribute defines attributes that data of a corresponding instance should have.

As described above, vessel data summarized by VDM should be described in the form that can be understood by both the system and the interest parties, and to this end, VCL is defined.

VCL is the language used to write a vessel data model configuration description file for describing VDM, and the present disclosure does not limit VCL to a particular type and may use all languages satisfying the following specification as VCL.

It is possible to describe all elements of vessel model, system model, data model.

It is possible to set the values of attributes that each element has, and extend the attributes.

It is possible to describe the combination model.

In an embodiment of the present disclosure, XML (eXtensible Markup Language) Schema Definition (XSD) is used as VCL satisfying the above-described specification. A vessel data model configuration description file (e.g., VDM Configuration XML) may be created based on VCL.

The vessel data model configuration description file is a configuration file that describes VDM in VCL, and includes definition of Vessel Part, System Part and Data Type Part.

Accordingly, it is possible to extract VDM from the vessel data model configuration description file that describes VDM in VCL, and extract VDM Path and data attributes from the extracted VDM.

Hereinafter, the vessel data integration platform (VDIP) for managing (collecting, storing, providing) vessel data in various formats made by different protocols in an integrated manner based on VDM will be described.

Figure 3:
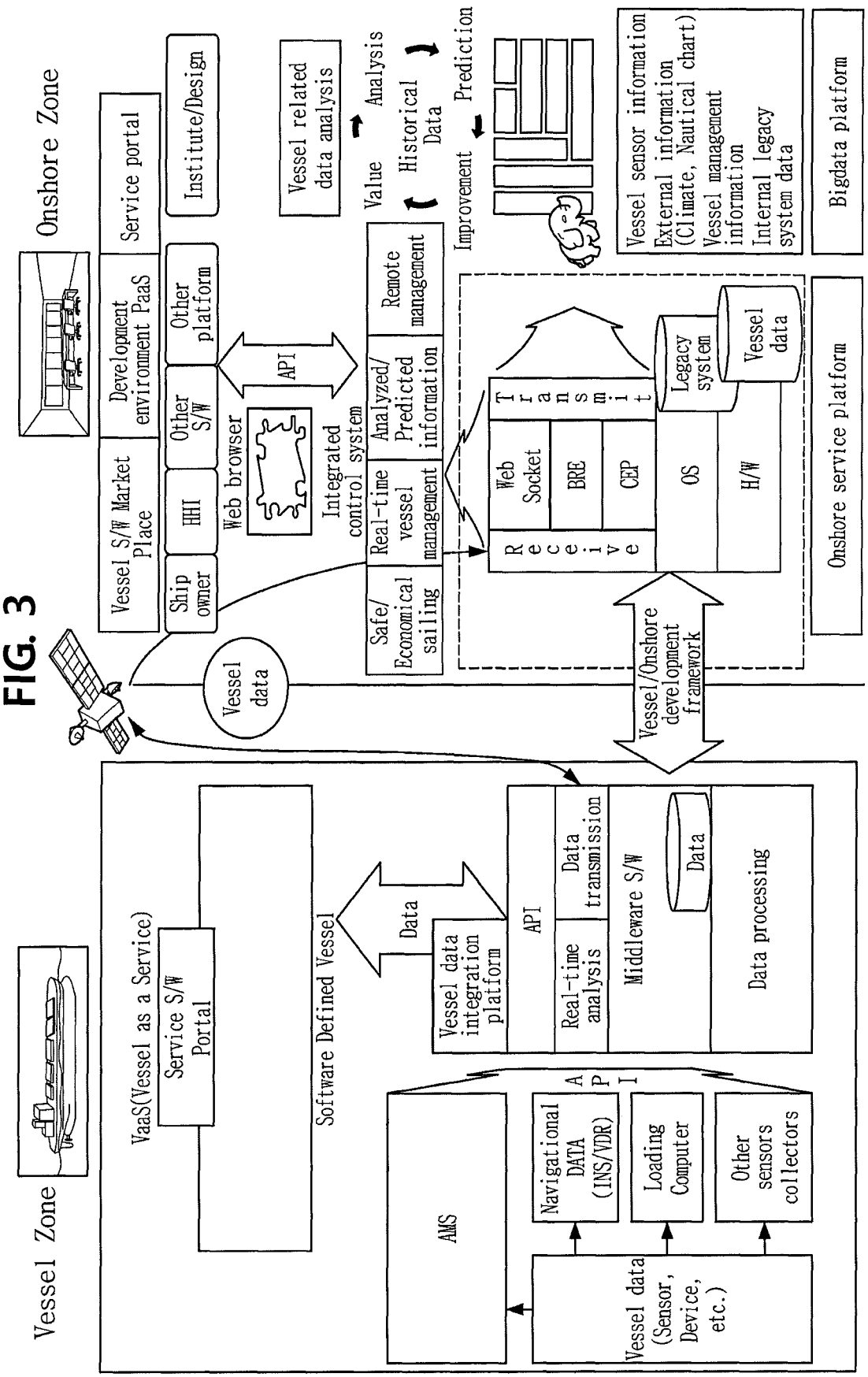
FIG. 3 is a schematic diagram showing the configuration of a smart ship with a vessel data integration platform according to an embodiment of the present disclosure.

FIG. 3 is a schematic diagram showing the configuration of a smart ship with the vessel data integration platform according to an embodiment of the present disclosure.

In FIG. 3, VDIP performs collection of various types of data in the vessel into a standardized system, processing and analysis, storage, onshore transmission and other onboard S/W data service.

Onshore service platform receives data transmitted from the vessel and stores it on the shore, and provides an overall service based on it.

Bigdata platform extracts and analyzes the value of data by data analysis of navigation information stored on the shore if necessary.

Figure 4:
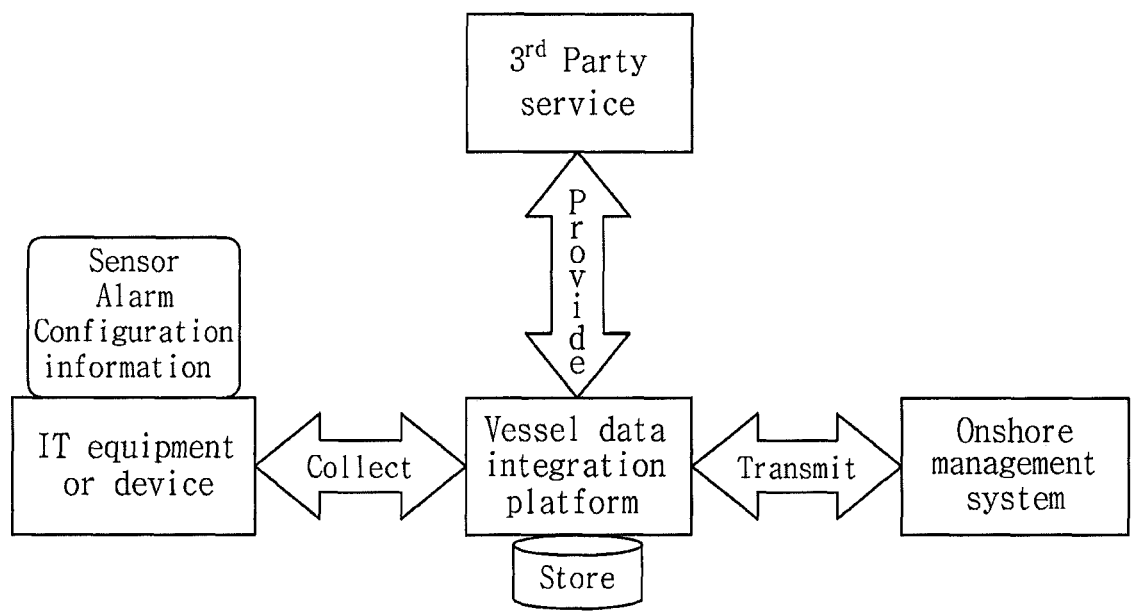
FIG. 4 is a schematic diagram showing the main functions of a vessel data integration platform according to an embodiment of the present disclosure.

FIG. 4 is a schematic diagram showing the main functions of the vessel data integration platform according to an embodiment of the present disclosure.

The VDIP converts vessel data (raw data) collected from IT equipment or devices, such as alarm data, sensor data and configuration data, into a systematized format based on VDM.

Additionally, the VDM-based integrated vessel data converted into a systematized format is transmitted to an onshore management system, or provided to a third-party service.

Here, the onshore management system may be a concept corresponding to the onshore service platform of FIG. 3.

Among the vessel data collected from the IT equipment or devices as described above, sensor data is a real value generated from the sensor installed in the vessel, alarm data is a value representing various type of warning signals generated in the vessel, and configuration data is configuration information for each sensor, for example, the unit (e.g., m, cm, ° C., °, etc.) of the numerical value used in sensor data and the minimum value (Min)/maximum value (Max) of the numerical value.

Figure 5:
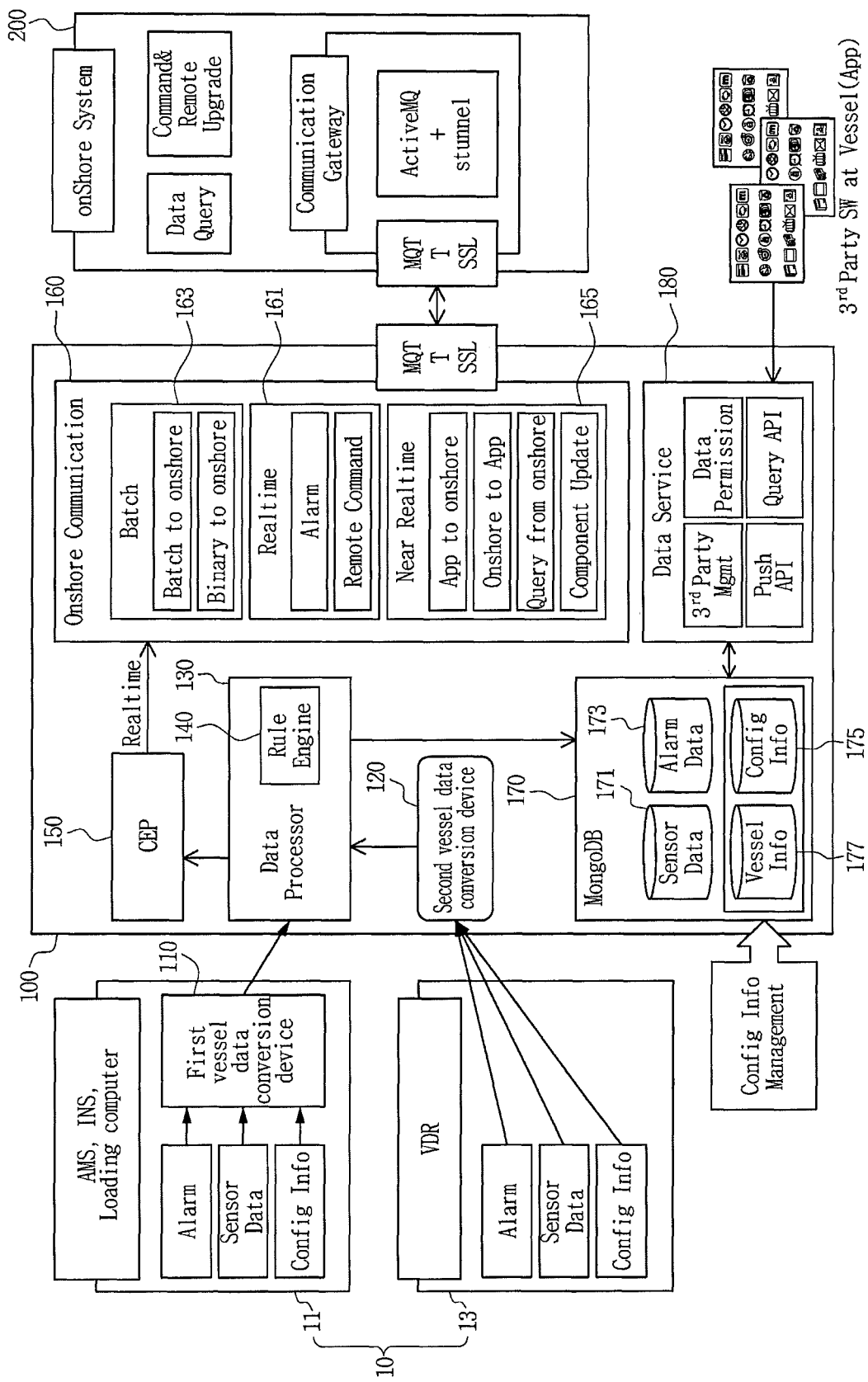
FIG. 5 is a schematic diagram showing the architecture of a vessel data integration system according to an embodiment of the present disclosure.

FIG. 5 is a schematic diagram showing the architecture of the vessel data integration system according to an embodiment of the present disclosure.

In FIG. 5, equipment 10 is mounted in the vessel for special purposes, and collects various types of vessel data (raw data) generated in different formats within the vessel, i.e., alarm data, sensor data and configuration data. Additionally, the equipment 10 transmits the collected vessel data (raw data) to the vessel data integration system 100.

That is, the VDIP 100 collects vessel data through at least one equipment (e.g., AMS, INS, a loading computer, VDR, etc.) 10. As such, the VDIP 100 may directly collect vessel data, but may use the existing vessel equipment 10 as a gateway for data collection.

Here, vessel data generated in the vessel covers various types including text, audio, image, video, etc.

The equipment 10 may be divided into first equipment 11 with a first vessel data conversion device 110 mounted thereon, and second equipment 13 with no first vessel data conversion device 110.

The first equipment 11 is where the first vessel data conversion device 110 is directly mounted, and collects vessel data in various formats from at least one sensor or device, and extracts Key that can identify vessel data and Value that is the content of vessel data (Key:Value) by parsing the collected vessel data in various formats.

Additionally, the first equipment 11 converts first vessel data in a non-standard format, Key and Value (Key:Value), into a VDM-based integrated vessel data format (VDM Path:Value) through the first vessel data conversion device 110, and transmits the converted integrated vessel data to the vessel data integration system 100.

That is, the first vessel data conversion device 110 converts the first vessel data in a non-standard format, Key and Value (Key:Value), into an integrated vessel data format (VDM Path:Value), by replacing Key received from the first equipment 11 with VDM Path assigned based on VDM. Here, a connection operation for replacing Key extracted from raw data with VDM Path assigned based on VDM is a "mapping" operation, and through the mapping operation, the extracted Key is connected to the VDM Path to convert validity verified Value into an integrated vessel data format (VDM Path:Value).

When converting Key and Value (Key:Value) into a VDM-based integrated vessel data format (VDM Path: Value) by replacing Key with VDM Path, it is necessary to verify the validity of Value of Key according to attribute of Data Attribute.

Data Attribute is attribute information of vessel data, and defines attributes that Value of vessel data should have. Accordingly, the validity of Value of Key extracted from raw data is verified according to attribute defined in Data Attribute corresponding to the corresponding vessel equipment.

The first equipment 11 may include an Alarm Monitoring System (AMS), an Integrated Navigation System (INS) and a loading computer.

The second equipment 13 converts vessel data collected in various formats into second vessel data in a standard format (e.g., NMEA format), and transmits it to the vessel data integration system 100 using the UDP or in the form of a file.

The second equipment 13 may include a Voyage Data Recorder (VDR).

The first vessel data conversion device 110 is mounted in the first equipment 11, and converts validity verified Value into an integrated vessel data format (VDM Path:Value) by connecting Key in first vessel data in a non-standard format outputted from the first equipment 11, i.e., vessel data in Key:Value format to VDM Path through a mapping operation.

The first vessel data conversion device 110 described above may be implemented as a program and installed on the first equipment 11.

The first vessel data conversion device 110 described above may be referred to as Agent.

The second vessel data conversion device 120 receives the second vessel data in a standard format (e.g., NMEA format) from the second equipment 13 using the UDP or in the form of a file.

Additionally, the second vessel data conversion device 120 extracts Key and Value (Key:Value) by parsing the second vessel data received from the second equipment 13, and converts the extracted Key and Value (Key:Value) into a VDM-based integrated vessel data format (VDM Path: Value) through a mapping operation.

The second vessel data conversion device 120 described above may be referred to as Adapter.

The integrated vessel data converted by the first vessel data conversion device 110 and the second vessel data conversion device 120 described above may be represented in JavaScript Object Notation (JSON) format.

When a data processing unit 130 receives the integrated vessel data from the first vessel data conversion device 110 or the second vessel data conversion device 120, the data processing unit 130 transmits the received integrated vessel data to Complex Event Processing (CEP) 150 based on tag information of the received integrated vessel data when the received data is data that is to be transmitted in real time like alarm data. Additionally, when the received data is data (e.g., sensor data, configuration data) that does not need to be transmitted in real time, the data processing unit 130 stores the received integrated vessel data in a storage DB 170.

The data processing unit 130 described above receives the integrated vessel data transmitted by the first vessel data conversion device 110 using a message queue.

A rule engine 140 manages a data validity validation rule necessary to verify the validity of the integrated vessel data received from the first vessel data conversion device 110 or the second vessel data conversion device 120. For example, the rule engine 140 may manage the minimum value (Min) and the maximum value (Max) for each sensor to verify the validity of sensor data.

Additionally, the rule engine 140 allows the integrated vessel data received from the first vessel data conversion device 110 or the second vessel data conversion device 120 to be stored in a corresponding DB provided in the storage DB 170. That is, sensor data is stored in a sensor data DB 171, alarm data is stored in an alarm data DB 173, and configuration data is stored in a configuration data DB 175.

The CEP 150 transmits data (e.g., alarm data) that is to be immediately transmission processed in real time among the integrated vessel data received from the data processing unit 130, in real time via satellite communication through an onshore communication unit 160.

Here, the communication protocol used for data transmission using satellite communication may include Message Queueing Telemetry Transport (MQTT), Constrained Application Protocol (CoAP), Mail, File Transfer Protocol (FTP), Simple Control Protocol (SCP), HyperText Transfer Protocol (HTTP), etc. Preferably, Internet of Things (IoT) application protocol, MQTT, may be used. Satellite communication services that can be used for data transmission may include 1) Fixed Satellite Service (FSS), 2) Mobile Satellite Service (MSS) and 3) Broadcast Satellite Service (BSS) according to the purpose of use, and may include 4) international satellite service (INTELSAT, INMARSAT), 5) regional satellite service (EUTELSAT, PANAMSAT) and 6) domestic satellite service (KORESAT, BS) according to the area. Additionally, Very Small Aperture Terminal (VSAT) that is a satellite communication service provided using small-diameter antennas and onshore equipment with low transmit output may be used. Preferably, Inmarsat Fleet-Broadband (FB), Inmarsat Global Express (Xpress) or Fleet Xpress may be used.

Additionally, data transmission by the onshore communication unit 160 may be performed through wireless communication protocols other than satellite communication. For example, Wireless LAN (WLAN), Wi-Fi, Wireless broadband (Wibro), World Interoperability for Microwave Access (Wimax), or general mobile communication methods such as High Speed Downlink Packet Access (HSDPA), $3^{rd}$ Generation (3G), Long Term Evolution (LTE), Long Term Evolution-Advanced (LTE-A), etc. may be used. Particularly, when the vessel including the vessel data integration system 100 is near or along the shore or close to the onshore management system 200, data transmission may be performed after changing to wireless communication, not satellite communication.

The onshore communication unit 160 is responsible for data transmission and reception between the vessel data integration system 100 and the onshore management system 200.

A real-time data transmission unit 161 of the onshore communication unit 160 is responsible for transmission processing of data (e.g., alarm data) that needs to be transmitted in real time.

A batch data transmission unit 163 is responsible for transmission processing of data stored in the storage DB 170 in a periodic time unit.

A remote data query unit 165 is responsible for querying the corresponding vessel data from the storage DB 170 and transmitting it in response to a vessel data query request from the shore.

The storage DB 170 stores and manages the integrated vessel data, and includes the sensor data DB 171 to store sensor data, the alarm data DB 173 to store alarm data, the configuration data DB 175 to store configuration data, and a vessel data DB 177 to store metadata and design data.

The above-described storage DB 170 stores the collected integrated vessel data for a predetermined period of time (e.g., 30 days) to allow history tracking on the shore and prevent data losses caused by network disconnection.

The vessel data stored in the above-described storage DB 170 is preferably stored according to the VDM system.

Additionally, the storage DB 170 may be implemented as MongoDB of Not only SQL (Structured Query Language) (NoSQL) to provide flexibility of data management.

A data service providing unit 180 searches for data that a third party service needs, in the storage DB 170, and provides it. Here, the third party service may specify and query desired data using VDM Path based on VDM.

When the third party service requests data using VDM Path, the data service providing unit 180 identifies if the third party service has an access authority for the VDM Path based data range requested from the third party service.

As a result of identification, only when the third party service has the access authority, the data service providing unit 180 may query the corresponding data and provide the query result to the third party service.

The data providing method largely includes Query method Push method.

The vessel data integration system configured as noted above collects vessel data in various formats made by different protocols, converts it into a systematic integrated vessel data format based on VDM, and provides the converted integrated vessel data to the shore or the third party service.

Hereinafter, the process of collecting vessel data in various formats made by different protocols and converting it into a VDM-based integrated vessel data format will be descried in more detail.

Figure 6:
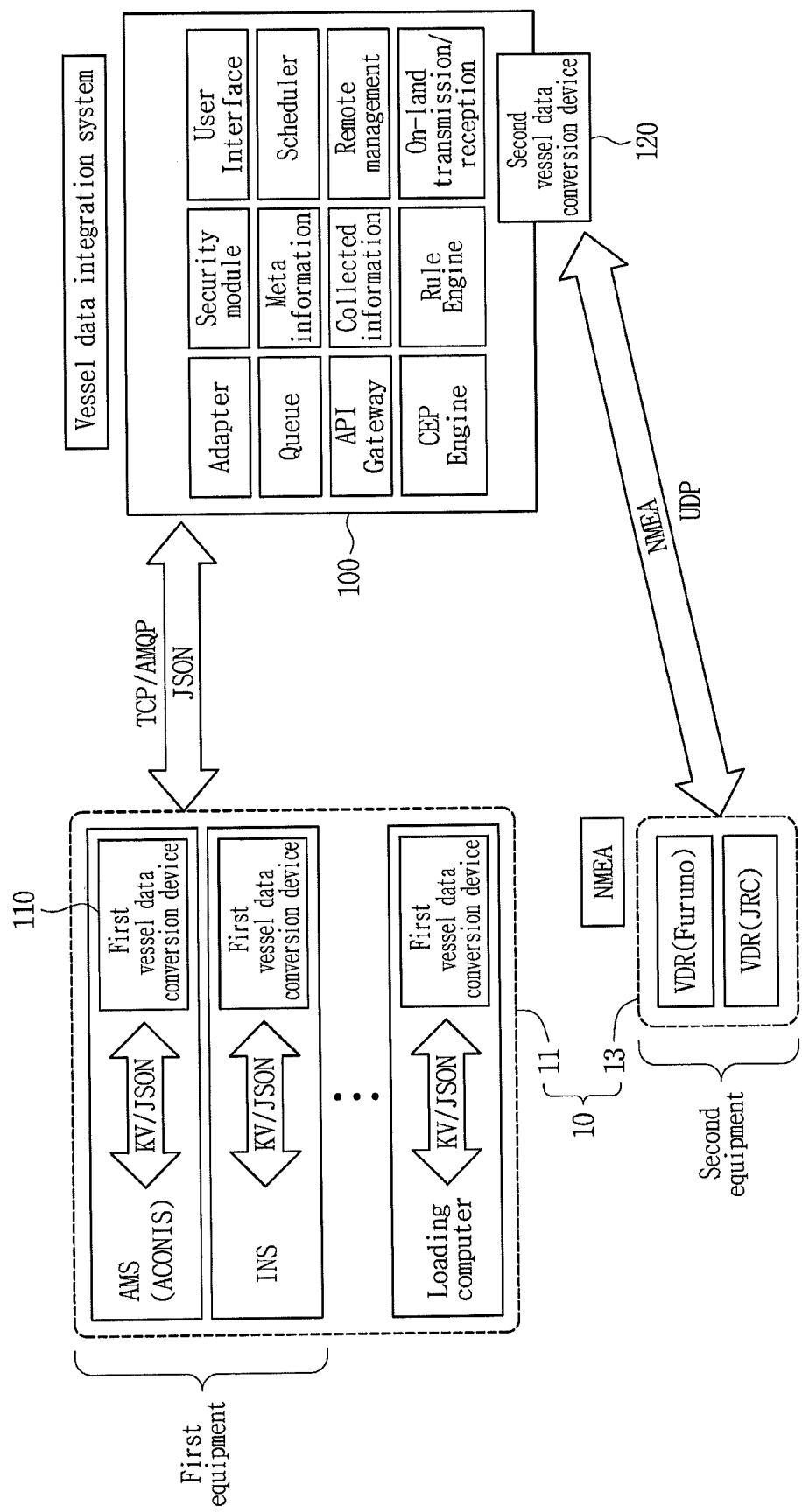
FIG. 6 is a diagram illustrating a process of collecting vessel data by a vessel data integration system according to an embodiment of the present disclosure.

FIG. 6 is a diagram illustrating a process of collecting vessel data by the vessel data integration system according to an embodiment of the present disclosure.

The vessel data integration system 100 according to an embodiment of the present disclosure collects vessel data through at least one equipment (e.g., AMS, INS, a loading computer, VDR, etc.) 10. As such, the vessel data integration system 100 may directly collect vessel data, but may use the existing vessel equipment 10 as a gateway for data collection.

Accordingly, in the present disclosure, the equipment 10 collects various types of vessel data (e.g., alarm data, sensor data, configuration data, etc.) generated in the vessel and transmits it to the vessel data integration system 100.

In the present disclosure, the equipment 10 may be divided into first equipment 11 with a first vessel data conversion device 110 mounted directly thereon, and second equipment 13 with no first vessel data conversion device 110 as previously described.

The first equipment 11 extracts Key and Value (Key:Value) from vessel data in various formats collected from one or more sensors or devices, and outputs the extracted Key and Value (Key:Value) to the first vessel data conversion device 110.

Figure 7:
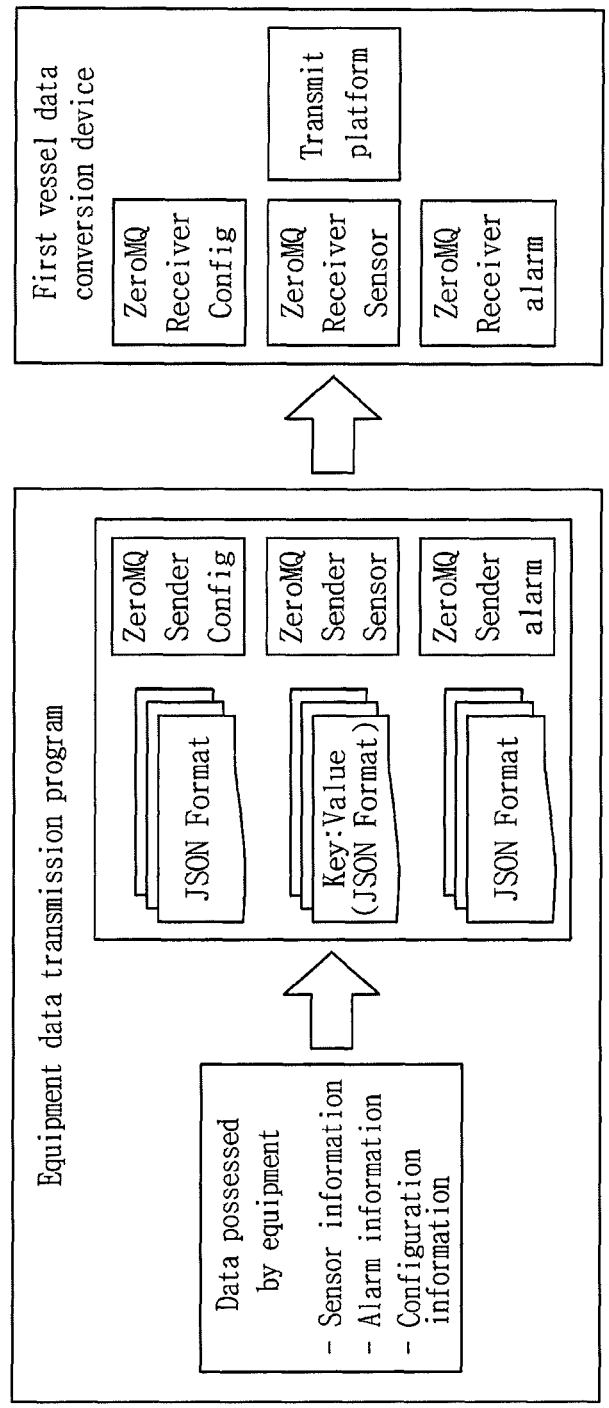
FIG. 7 is an equipment data transmission diagram according to an embodiment of the present disclosure.

The first equipment 11 described above may manage vessel data (raw data) such as alarm data, sensor data and configuration data by generating a separate transmission and reception channel (e.g., ZeroMQ) as shown in FIG. 7.

The first vessel data conversion device 110 having received the first vessel data in Key:Value format outputted from the first equipment 11 as described above converts into a VDM-based integrated vessel data format (VDM Path:Value) by connecting Key to VDM Path through a mapping operation.

Additionally, the integrated vessel data converted into an integrated vessel data format is transmitted to the vessel data integration system 100. Here, the integrated vessel data may be expressed in JSON format.

As described above, the first vessel data conversion device 110 having received the first vessel data outputted in Key and Value format (Key:Value) from the first equipment 11 converts the first vessel data into an integrated vessel data format (VDM Path:Value) as below through a mapping operation. Here, the mapping operation is performed by a mapper in the first vessel data conversion device 110, and Key may not be used after the first vessel data conversion device 110.

```
KV Input
    sensor1='23'
    sensor2='55'
JSON Output
    { vdmpath:"Equipment/...".
      key: "sensor1".
      value: 23.
      dataset: "group1"}.
    { vdmpath:"Equipment/...".
      key: "sensor2".
      value: 55}
```

The second equipment 13 converts the collected vessel data in various formats into a standard format (e.g., NMEA format).

Additionally, the second vessel data converted into a standard format (e.g., NMEA format) is transmitted to the second vessel data conversion device 120 of the vessel data integration system 100 using the UDP or in the form of a file.

The second vessel data conversion device 120 extracts Key and Value (Key:Value) by parsing the second vessel data received from the second equipment 13 using the UDP or in the form of a file, and converts the extracted Key and Value (Key:Value) into a VDM-based integrated vessel data format (VDM Path:Value) through a mapping operation.

The second equipment 13 described above transmits the second vessel data converted into a standard format (e.g., NMEA format) to a Proxy server, and the first vessel data conversion device installed in the Proxy server may be implemented to extract Key and Value (Key:Value) by parsing the second vessel data received from the second equipment 13, convert the extracted Key and Value (Key:Value) into a VDM-based integrated vessel data format (VDM Path:Value) through a mapping operation, and transmit the converted integrated vessel data to the vessel data integration system 100.

Here, to effectively process a lot of vessel data generated periodically from equipment 10:11, 13, the vessel data integration system 100 performs queue-based asynchronous processing internally, and a queue, UDP or a file is used for communication between the first vessel data conversion device 110 or the second vessel data conversion device 120 and the vessel data integration system 100 according to the type of equipment.

As described above, the vessel data integration system 100 collects vessel data through at least one equipment 10:11, 13, and the equipment 10:11, 13 in the vessel is developed in various languages and complies with its own data providing method.

Accordingly, it is possible to enable data connection and exchange of a mapping configuration description file between the vessel data integration system 100 and each equipment 10:11, 13 through the first vessel data conversion device 110 or the second vessel data conversion device 120, to allow for consistent data transmission and reception between equipment-vessel data integration system.

The type of data connection method between the vessel data integration system 100 and the equipment 10:11, 13 is largely divided into two, i.e., a connection method through the first vessel data conversion device 110, and a connection method through the second vessel data conversion device 120, according to the data collection method as previously described.

Figure 8:
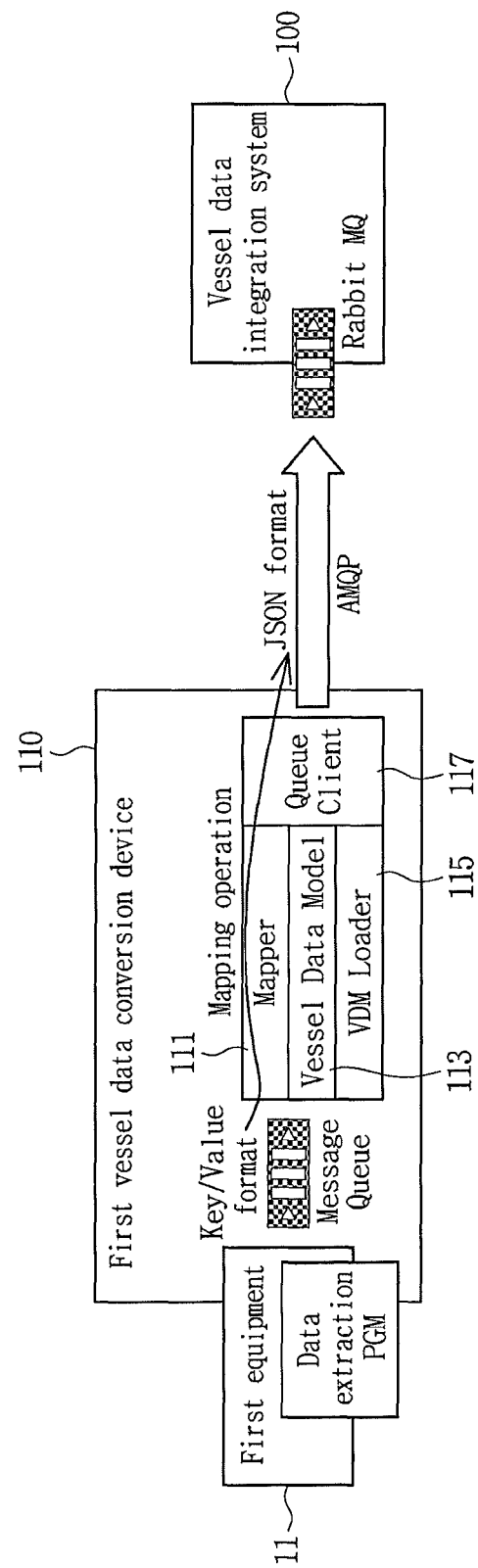
FIG. 8 is a diagram illustrating a process of converting vessel data in a first vessel data conversion device according to an embodiment of the present disclosure.

As shown in FIG. 8, the first vessel data conversion device 110 converts the validity verified Value into an integrated vessel data format (VDM Path:Value) by connecting Key in first vessel data in Key:Value format outputted from the first equipment 11 to VDM Path through a mapping operation.

In FIG. 8, the mapper 111 includes a mapping configuration description file that defines a mapping rule between Key and VDM Path, i.e., a data conversion rule for converting first vessel data outputted from the first equipment 11 into VDM-based integrated vessel data, and through the mapping rule defined in the mapping configuration description file, the first vessel data received from the first equipment 11 through a message queue is converted into VDM-based integrated vessel data. That is, Key and Value (Key:Value) is converted into a VDM-based integrated vessel data format (VDM Path:Value) by connecting Key in the first vessel data in Key:Value format received from the first equipment 11 to VDM Path through a mapping operation.

The mapper 111 described above preferably verifies the validity of Value according to attribute of Data Attribute, when converting Key and Value (Key:Value) into a VDM-based integrated vessel data format (VDM Path:Value).

A VDM 113 defines the classification system of objects in the vessel and the system drawn to describe data of the objects.

A VDM loader 115 loads the vessel data model configuration description file that describes the VDM using VCL.

A queue client 117 transmits the VDM-based integrated vessel data converted by the mapper 111 to the data processing unit 130 of the vessel data integration system 100 using a queue-based transmission protocol.

Figure 9:
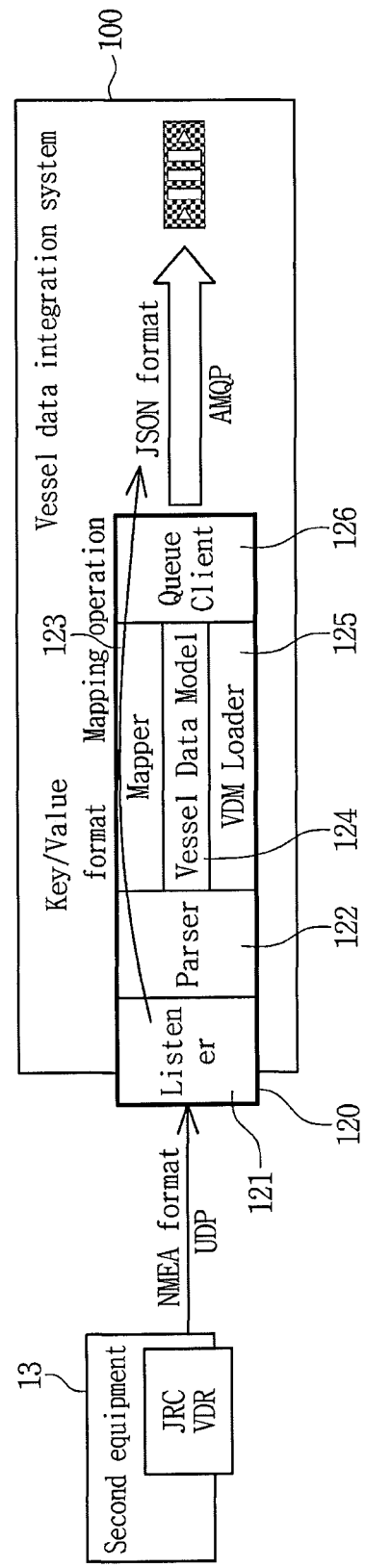
FIG. 9 is a diagram illustrating a process of converting vessel data in a second vessel data conversion device according to an embodiment of the present disclosure.

As shown in FIG. 9, the second vessel data conversion device 120 receives second vessel data in a standard format (e.g., NMEA format) from the second equipment 13, extracts Key and Value (Key:Value) from the received second vessel data and converts it into a VDM-based integrated vessel data format.

In FIG. 9, a listener 121 receives second vessel data outputted from the second equipment 13 using the UDP or in the form of a file.

A vessel data parsing unit 122 extracts Key and Value (Key:Value) by parsing the second vessel data received through the listener 121.

A mapper 123 includes a mapping configuration description file that defines a mapping rule between Key and VDM Path, i.e., a data conversion rule for converting second vessel data outputted from the second equipment 13 into VDM-based integrated vessel data, and through the mapping rule defined in the mapping configuration description file, second vessel data outputted from the second equipment 13 is converted into VDM-based integrated vessel data. That is, Key and Value (Key:Value) extracted by the vessel data parsing unit 122 is converted into a VDM-based integrated vessel data format (VDM Path:Value) through a mapping operation.

The mapper 123 described above preferably verifies the validity of Value according to attribute of Data Attribute, when converting Key and Value (Key:Value) into a VDM-based integrated vessel data format (VDM Path:Value).

A VDM 124 defines the classification system of objects in the vessel and the system drawn to describe data of the objects.

A VDM loader 125 loads the vessel data model configuration description file that describes the VDM using VCL.

A queue client 126 transmits the VDM-based integrated vessel data converted by the mapper 123 to the data processing unit 130 of the vessel data integration system 100 using a queue-based transmission protocol.

As described above, the first vessel data conversion device 110 and the second vessel data conversion device 120 convert vessel data in various formats made by different protocols collected respectively from the first equipment 11 and the second equipment 13 into a VDM-based integrated vessel data format.

The VDM that systemizes and efficiently manages vessel data is defined based on the classification system of objects in the vessel and the system drawn to describe data of the objects, and as previously described, the VDM is described through the VCL-based vessel data model configuration description file. That is, all information and data of the vessel is defined through the VCL-based vessel data model configuration description file.

Figure 10:
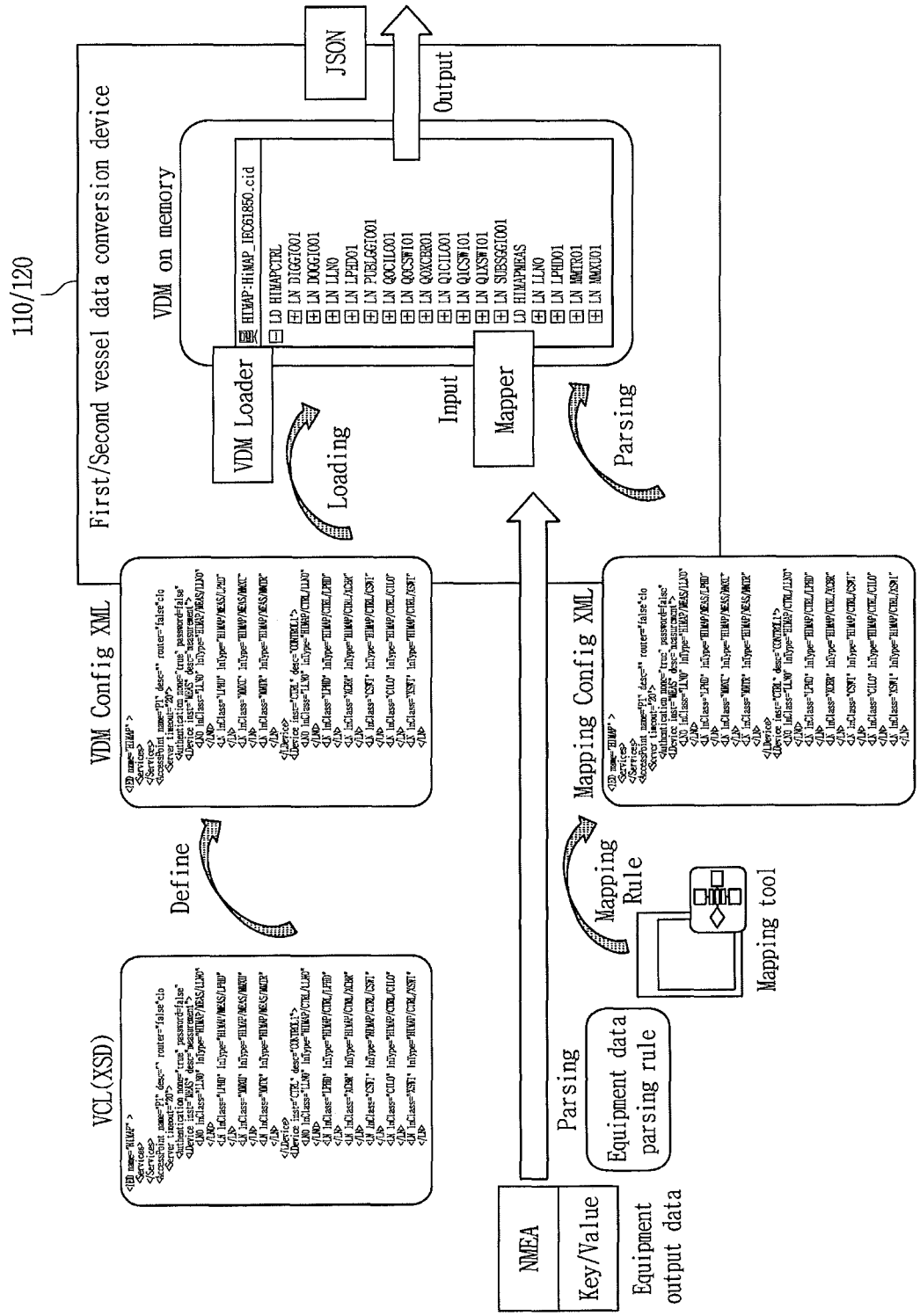
FIGS. 10 and 11 are diagrams illustrating a process of converting vessel data according to an embodiment of the present disclosure.

Additionally, as shown in FIG. 10, vessel data outputted from the first equipment 11 or the second equipment 13 is parsed by the first vessel data conversion device 110 or the second vessel data conversion device 120 according to the equipment parsing rule, and converted into a VDM-based integrated vessel data format through the mapping rule defined in the mapping configuration description file.

The mapping rule may be individually set for each equipment 10:11, 13 provided in the vessel.

Figure 11:
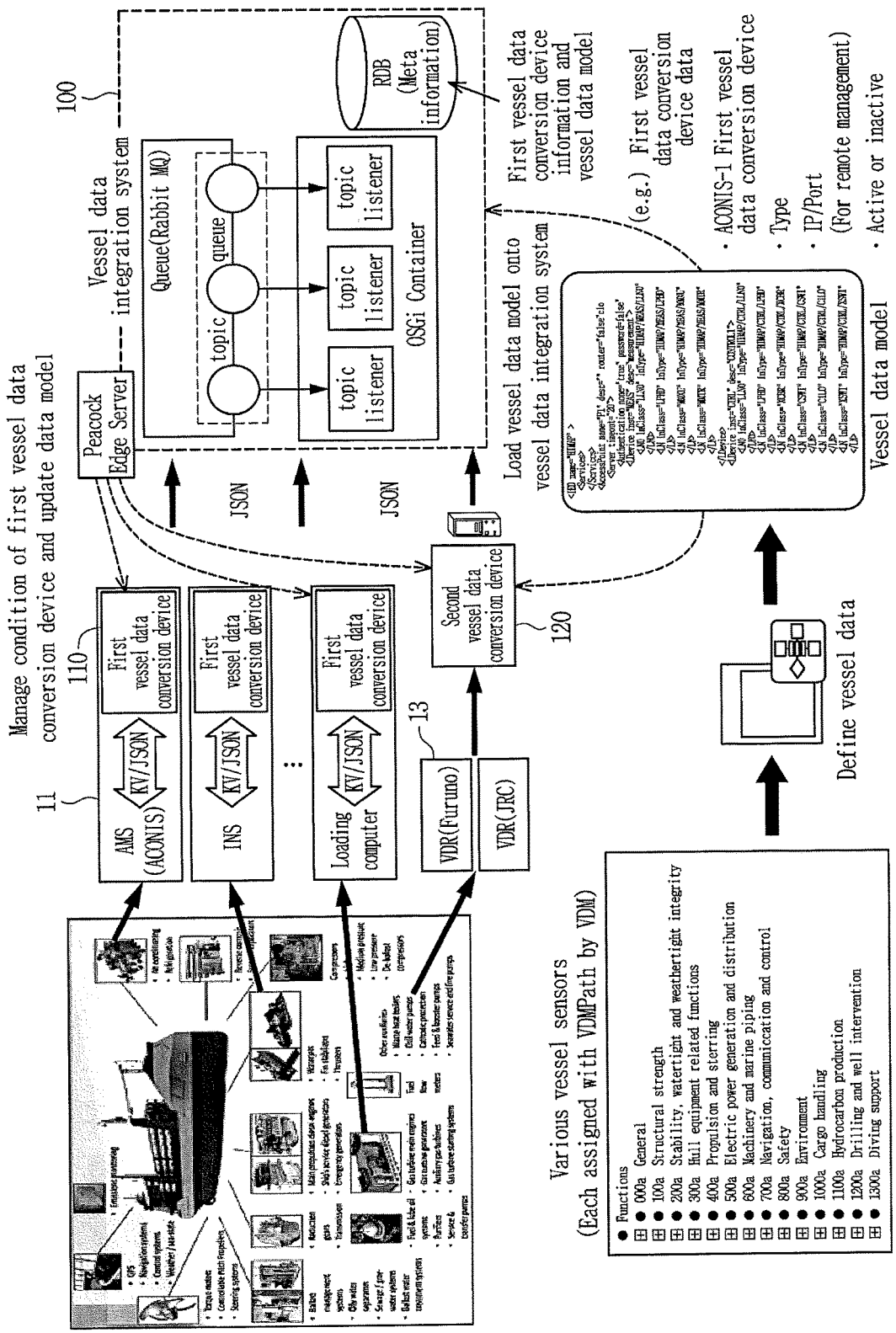

As described above, vessel data generated from each sensor and device of the vessel is collected through the first vessel data conversion device 110 or the second vessel data conversion device 120 of the equipment 11, and the vessel data integration system 100 registers and manages the first vessel data conversion device 110 and the second vessel data conversion device 120 as shown in FIG. 11. Additionally, the integrated vessel data is transmitted and received between the first vessel data conversion device 110 and the second vessel data conversion device 120 and the vessel data integration system 100 through VDM, and each integrated vessel data is identified by VDM Path.

The first vessel data conversion device 110 mounted in the equipment 11 or the second vessel data conversion device 120 mounted in the vessel data integration system 100 can be easily extended in the case that a new sensor or new equipment is registered, because of using the VCL-based VDM and the mapping rule.

That is, all information and data of the vessel is defined through the VCL-based vessel data model configuration description file.

Additionally, equipment output data is parsed according to the equipment parsing rule and converted into VDM-based integrated vessel data through the mapping rule defined in the mapping configuration description file.

Accordingly, when vessel data outputted from the equipment 10:11, 13 is changed due to a change (or addition) of the equipment 10:11, 13 of the vessel, it is necessary to modify the vessel data model configuration description file that defines the data model of the corresponding vessel and the mapping configuration description file that manages the mapping rule between equipment data.

Figure 12:
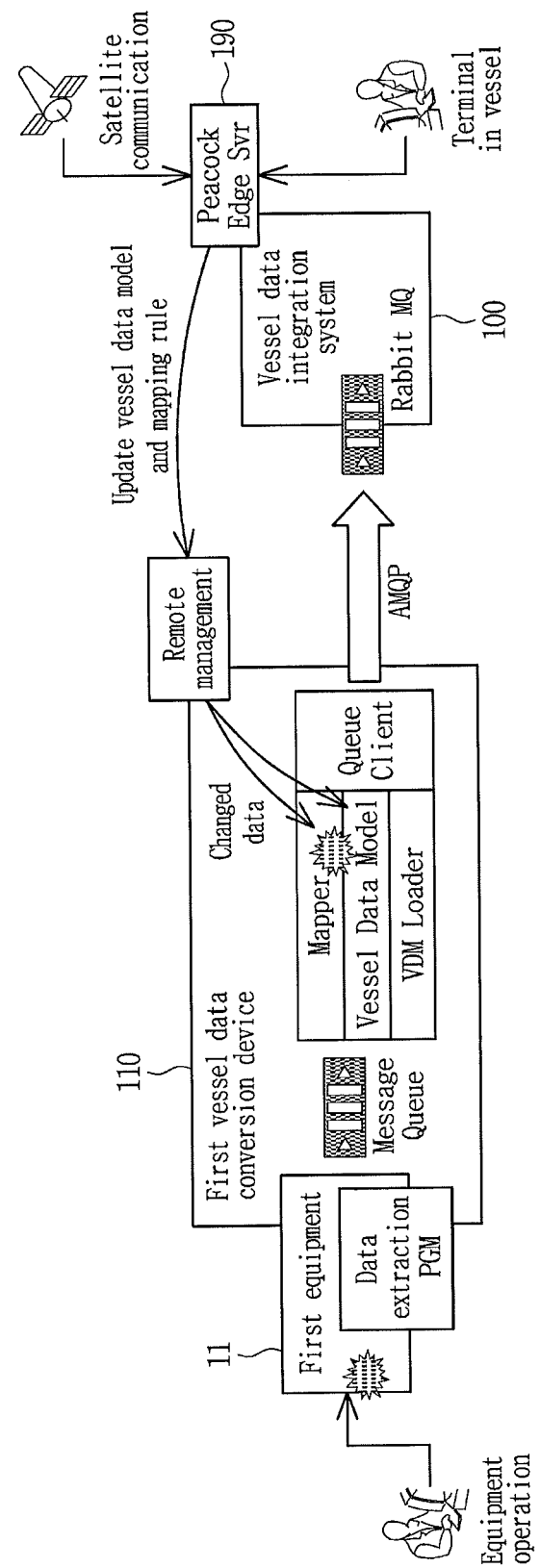
FIG. 12 is a diagram illustrating a process of updating a vessel data model configuration description file and a mapping configuration description file with a change in equipment according to an embodiment of the present disclosure.

When the vessel data model configuration description file or the mapping configuration description file is changed, as shown in FIG. 12, the vessel data integration system 100 receives the corresponding content from the onshore management system through the satellite and transmits it to the first vessel data conversion device 110 or the second vessel data conversion device 120 through Peacock Edge Server 190.

The first vessel data conversion device 110 or the second vessel data conversion device 120 having received the changed content from the onshore management system through the satellite as described above changes the vessel data model configuration description file or the mapping configuration description file according to the received changed content.

Figure 13:
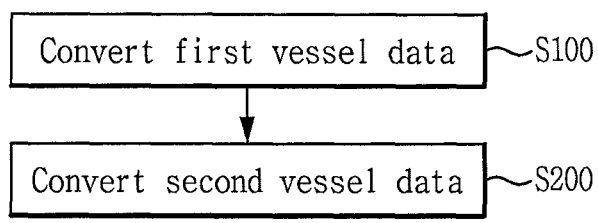
FIG. 13 is a processing diagram illustrating a method for converting vessel data in a vessel data integration system according to an embodiment of the present disclosure.

FIG. 13 is a processing diagram illustrating a method for converting vessel data in the vessel data integration system according to an embodiment of the present disclosure.

The method for converting vessel data in the vessel data integration system according to an embodiment of the present disclosure includes the first vessel data conversion step (S100) in which the first vessel data conversion device 110 receives first vessel data in a non-standard format (Key:Value) from the first equipment 11 and converts it into integrated vessel data in a systemized data format using VDM-based VDM Path, and the second vessel data conversion step (S200) in which the second vessel data conversion device 120 receives second vessel data in a standard format (e.g., NMEA format) from the second equipment 13, and converts into integrated vessel data in a systemized data format using VDM-based VDM Path.

Figure 14:
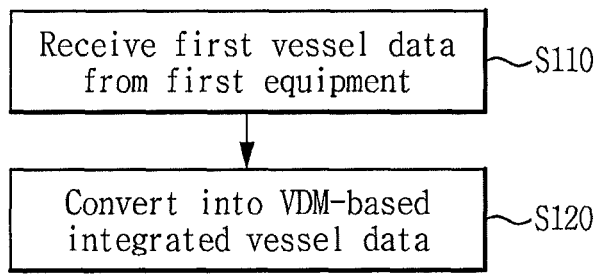
FIG. 14 is a processing diagram illustrating the first vessel data conversion step (S100) in FIG. 13.

FIG. 14 is a processing diagram illustrating the first vessel data conversion step S100 in FIG. 13.

First, the first vessel data conversion device 110 receives first vessel data in a non-standard format, Key and Value, from the first equipment 11 (S110).

Subsequently, Key and Value (Key:Value) is converted into a systemized data format, or a VDM-based integrated vessel data format (VDM Path:Value), by replacing Key received in the above-described step S110 with VDM-based VDM Path (S120).

Figure 15:
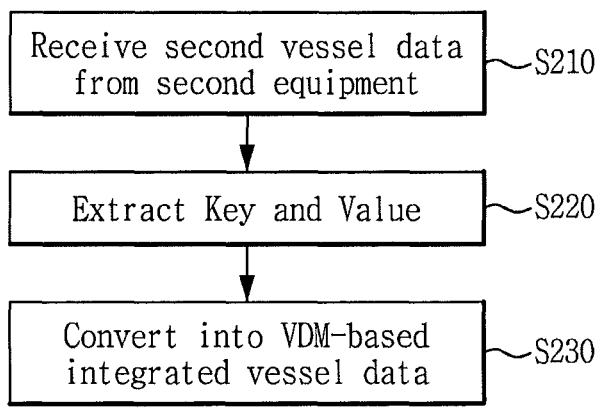
FIG. 15 is a processing diagram illustrating the second vessel data conversion step (S200) in FIG. 13.

FIG. 15 is a processing diagram illustrating the second vessel data conversion step S200 in FIG. 13.

First, the second vessel data conversion device 120 receives second vessel data converted into a standard format (e.g., NMEA format) from the second equipment 13 (S210).

Subsequently, Key and Value is extracted by parsing the second vessel data received through the above-described step S210 (S220).

Additionally, Key and Value (Key:Value) is converted into a VDM-based integrated vessel data format (VDM Path:Value) by replacing Key extracted in the above-described step S220 with VDM-based VDM Path (S230).

The vessel data integration system as noted above may be implemented in the form of software and firmware that manages vessel data in an integrated manner and be provided in the vessel, and may be implemented as any system including software, firmware and hardware devices that manages vessel data in an integrated manner or their selective combinations and be provided in the vessel.

Those having ordinary skill in the technical field pertaining to the present disclosure will appreciate that various modifications and changes may be made without departing from the essential nature of the present disclosure. Additionally, the embodiments disclosed in the specification and drawings are only a particular embodiment presented to easily describe the disclosure and help the understanding of the present disclosure, but not intended to limit the scope of the present disclosure. Therefore, it should be interpreted that the scope of the present disclosure covers the embodiments disclosed herein as well as all modified or changed forms derived based on the technical spirit of the present disclosure.

INDUSTRIAL APPLICABILITY

According to the vessel data integration system of the present disclosure and the vessel comprising the same, it is possible to manage (collect, store, provide) vessel data in all formats made by different protocols into an integrated data format.

The invention claimed is:

1. A vessel data integration system comprising:
   a first vessel data conversion device for converting first vessel data which have a non-standard format and are received from first equipment into first integrated vessel data having an integrated vessel data format by using a vessel data model (VDM)-based VDM Path, the VDM defining a relationship between instances of the VDM, the VDM Path being an object identifier for identifying an instance defined by the VDM; and
   a second vessel data conversion device for converting second vessel data which have a standard format and are received from second equipment into second integrated vessel data having the integrated vessel data format,
   wherein the VDM includes a vessel model, a system model and a data model,
   the vessel model defines hierarchical structure in an order of vessel, equipment group, equipment and component,
   the system model defines hierarchical structure in an order of system, logical device and logical node for collecting vessel data, and
   the data model defines hierarchical structure in an order of data object about structure of vessel data and data attribute about attribute of vessel data.

2. The vessel data integration system according to claim 1, wherein the first equipment collects vessel data in different formats, extracts Key and Value by parsing the collected vessel data in different formats, and outputs the extracted Key and Value to the first vessel data conversion device.

3. The vessel data integration system according to claim 2, wherein the first vessel data conversion device converts the first vessel data into the integrated vessel data by replacing the Key received from the first equipment with the VDM Path.

4. The vessel data integration system according to claim 2, wherein the first vessel data conversion device comprises:
   a mapper including a mapping configuration description file that defines a mapping rule between the Key and the VDM Path, and which converts the first vessel data into the integrated vessel data by replacing the Key received from the first equipment with the VDM Path according to the mapping rule; and
   a queue client to transmit the integrated vessel data converted by the mapper to a data processing unit using a queue-based transmission protocol.

5. The vessel data integration system according to claim 4, wherein the mapper verifies the validity of the Value according to attribute of Data Attribute when converting the first vessel data or the second vessel data into the integrated vessel data.

6. The vessel data integration system according to claim 2, wherein the second vessel data conversion device extracts Key and Value by parsing the second vessel data received from the second equipment, and converts the second vessel data into the integrated vessel data by replacing the Key with the VDM Path.

7. The vessel data integration system according to claim 2, wherein the integrated vessel data incudes the VDM Path and the Value.

8. The vessel data integration system according to claim 1, wherein the second equipment collects vessel data in different formats, converts the collected vessel data in different formats into a standard format, and outputs it to the second vessel data conversion device.

9. The vessel data integration system according to claim 1, wherein the standard format is a National Marine Electronics Association (NMEA) format.

10. The vessel data integration system according to claim 1, wherein the first vessel data conversion device is included in the first equipment.

11. The vessel data integration system according to claim 1, wherein the second vessel data conversion device comprises:
 a listener to receive the second vessel data from the second equipment;
 a vessel data parsing unit to extract Key and Value by parsing the second vessel data;
 a mapper including a mapping configuration description file that defines a mapping rule between the Key and the VDM Path, and which converts the second vessel data into the integrated vessel data by replacing the Key with the VDM Path according to the mapping rule; and
 a queue client to transmit the integrated vessel data converted by the mapper to a data processing unit using a queue-based transmission protocol.

12. A method for converting vessel data in a vessel data integration system, comprising:
 the first vessel data conversion step of converting, by a first vessel data conversion device, first vessel data which have a non-standard format and are received from first equipment into first integrated vessel data having an integrated vessel data format by using a vessel data model (VDM)-based VDM Path, the VDM defining a relationship between instances of the VDM, the VDM Path being an object identifier for identifying an instance defined by the VDM; and
 the second vessel data conversion step of converting, by a second vessel data conversion device, second vessel data which have a standard format and are received from second equipment into second integrated vessel data having the integrated vessel data format,
 wherein the VDM includes a vessel model, a system model and a data model,
 the vessel model defines hierarchical structure in an order of vessel, equipment group, equipment and component,
 the system model defines hierarchical structure in an order of system, logical device and logical node for collecting vessel data, and
 the data model defines hierarchical structure in an order of data object about structure of vessel data and data attribute about attribute of vessel data.

13. The method for converting vessel data in the vessel data integration system according to claim 12, wherein the first vessel data conversion step comprises:
 receiving, by the first vessel data conversion device, Key and Value from the first equipment, the Key and the Value being the first vessel data; and
 converting, by the first vessel data conversion device, the first vessel data into the integrated vessel data by replacing the Key with VDM-based VDM Path.

14. The method for converting vessel data in the vessel data integration system according to claim 12, wherein the second vessel data conversion step comprises:
 receiving, by the second vessel data conversion device, the second vessel data from the second equipment;
 extracting, by the second vessel data conversion device, Key and Value, by parsing the second vessel data; and
 converting, by the second vessel data conversion device, the second vessel data into the integrated vessel data by replacing the Key with VDM-based VDM Path.

* * * * *